US009842213B2

(12) United States Patent
Dadu et al.

(10) Patent No.: US 9,842,213 B2
(45) Date of Patent: Dec. 12, 2017

(54) MECHANISMS FOR LOCKING COMPUTING DEVICES (71) Applicant: Intel Corporation, Santa Clara, CA (US)

(72) Inventors: Saurabh Dadu, Tigard, OR (US); Gyan Prakash, Beaverton, OR (US); Rajesh Poornachandran, Portland, OR (US); Jiphun Satapathy, Portland, OR (US); Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 15/218,277

(22) Filed: Jul. 25, 2016

(65) Prior Publication Data
US 2016/0335438 A1    Nov. 17, 2016

Related U.S. Application Data (63) Continuation of application No. 13/991,611, filed as application No. PCT/US2013/032031 on Mar. 15, 2013, now Pat. No. 9,400,895.

(51) Int. Cl.
G06F 7/04       (2006.01)
G06F 21/57      (2013.01)
(Continued)

(52) U.S. Cl.
CPC ............ *G06F 21/575* (2013.01); *G06F 21/31* (2013.01); *G06F 21/34* (2013.01); *G06F 21/35* (2013.01);
(Continued)

(58) Field of Classification Search
CPC ........ G06F 21/31; G06F 21/34; G06F 21/575; G06F 21/70; G06F 21/88
(Continued)

(56) References Cited

U.S. PATENT DOCUMENTS 5,347,425 A    9/1994 Herron et al.
5,757,616 A    5/1998 May et al.
(Continued)

FOREIGN PATENT DOCUMENTS

WO    WO-2014142960 A1    9/2014

OTHER PUBLICATIONS

"U.S. Appl. No. 13/991,611, Examiner Interview Summary dated Feb. 2, 2016", 3 pgs.
(Continued)

Primary Examiner — Samson Lemma
(74) Attorney, Agent, or Firm — Schwegman Lundberg & Woessner, P.A.

(57) ABSTRACT

Various systems and methods for locking computing devices are described herein. In an example, a portable device comprises an electro-mechanical lock; and a firmware module coupled to the electro-mechanical lock, the firmware module configured to: receive an unlock code; validate the unlock code; and unlock the electro-mechanical lock when the unlock code is validated. In another example, device for managing BIOS authentication, the device comprising an NFC module, the NFC module comprising an NFC antenna; and a firmware module, wherein the firmware module is configured to: receive an unlock code from an NFC device via the NFC antenna; validate the unlock code; and unlock a BIOS of the device when the unlock code is validated.

20 Claims, 4 Drawing Sheets (51) Int. Cl.
*G06F 21/70* (2013.01)
*G06F 21/31* (2013.01)
*G06F 21/34* (2013.01)
*G06F 21/88* (2013.01)
*G06F 21/35* (2013.01)

(52) U.S. Cl.
CPC .............. *G06F 21/70* (2013.01); *G06F 21/88* (2013.01); *G06F 2221/032* (2013.01)

(58) Field of Classification Search
USPC ..................................................... 726/19, 34
See application file for complete search history.

(56) References Cited

U.S. PATENT DOCUMENTS

| | | | |
|---|---|---|---|
| 5,983,073 | A | 11/1999 | Ditzik |
| 6,421,235 | B2 | 7/2002 | Ditzik |
| 8,298,295 | B2* | 10/2012 | Aissi ............. G06F 21/88 726/34 |
| 8,321,916 | B2* | 11/2012 | Aissi ............. G06F 21/6209 726/35 |
| 8,526,880 | B2* | 9/2013 | Foster ............. H04M 1/72577 370/302 |
| 8,869,261 | B1 | 10/2014 | Carter |
| 8,912,901 | B2 | 12/2014 | Hoeth |
| 9,384,480 | B2* | 7/2016 | Jain ............. G06K 19/07739 |
| 9,397,989 | B1* | 7/2016 | Ramalingam ........... H04L 63/08 |
| 9,400,895 | B2 | 7/2016 | Dadu et al. |
| 2005/0097930 | A1 | 5/2005 | Moore et al. |
| 2005/0159184 | A1 | 7/2005 | Kerner et al. |
| 2006/0128361 | A1 | 6/2006 | Kim |
| 2008/0065897 | A1 | 3/2008 | Jayaram et al. |
| 2008/0110217 | A1* | 5/2008 | Andrews ............. E05B 73/0082 70/58 |
| 2009/0273895 | A1 | 11/2009 | Sakaguchi |
| 2010/0159911 | A1* | 6/2010 | Childs ............. G06F 21/88 455/419 |
| 2011/0018707 | A1 | 1/2011 | Dobson et al. |
| 2011/0258251 | A1 | 10/2011 | Antoci |
| 2012/0114122 | A1 | 5/2012 | Metivier |
| 2012/0322369 | A1* | 12/2012 | Khan ............. H04B 5/0031 455/41.1 |
| 2013/0185137 | A1* | 7/2013 | Shafi ............. G06Q 30/0207 705/14.35 |
| 2014/0087654 | A1* | 3/2014 | Kiveisha ............. H04B 5/0031 455/41.1 |
| 2014/0218167 | A1* | 8/2014 | Tseng ............. E05B 47/02 340/5.61 |
| 2014/0248853 | A1* | 9/2014 | Shipley ............. H04W 12/06 455/411 |
| 2014/0283018 | A1 | 9/2014 | Dadu et al. |

OTHER PUBLICATIONS

"U.S. Appl. No. 13/991,611, Final Office Action dated Jul. 1, 2015", 17 pgs.
"U.S. Appl. No. 13/991,611, Non Final Office Action dated Feb. 12, 2015", 17 pgs.
"U.S. Appl. No. 13/991,611, Non Final Office Action dated Aug. 20, 2015", 18 pgs.
"U.S. Appl. No. 13/991,611, Notice of Allowance dated Mar. 22, 2016", 15 pgs.
"U.S. Appl. No. 13/991,611, Preliminary Amendment filed Jun. 4, 2013", (Jun. 4, 2013), 7 pgs.
"U.S. Appl. No. 13/991,611, Response filed May 12, 2015 to Non Final Office Action dated Feb. 12, 2015", 10 pgs.
"U.S. Appl. No. 13/991,611, Response filed Jul. 17, 2015 to Final Office Action dated Jul. 17, 2015", 7 pgs.
"U.S. Appl. No. 13/991,611, Response filed Nov. 19, 2015 to Non Final Office Action dated Aug. 20, 2015", 8 pgs.
"U.S. Appl. No. 13/991,611, Response filed Dec. 23, 2014 to Restriction Requirement dated Oct. 23, 2014", 7 pgs.
"U.S. Appl. No. 13/991,611, Restriction Requirement dated Oct. 23, 2014", 6 pgs.
"International Application Serial No. PCT/US2013/032031, International Preliminary Report on Patentability dated Sep. 24, 2015", 10 pgs.
"International Application Serial No. PCT/US2013/032031, International Search Report dated Dec. 24, 2013", 3 pgs.
"International Application Serial No. PCT/US2013/032031, Written Opinion dated Dec. 24, 2013", 8 pgs.

* cited by examiner

MECHANISMS FOR LOCKING COMPUTING DEVICES

PRIORITY APPLICATIONS

This application is a continuation of U.S. application Ser. No. 13/991,611, filed Jun. 4, 2013, issued as U.S. Pat. No. 9,400,895, which is a U.S. National Stage Application under 35 U.S.C. 371 from International Application Serial No. PCT/US2013/032031, filed Mar. 15, 2013, published as WO 2014/142960, all of which are incorporated herein by reference in their entirety.

TECHNICAL FIELD

Embodiments described herein generally relate to mechanisms for locking computing devices.

BACKGROUND

Information theft is an ever increasing threat. Data is vulnerable to theft when at rest, in transit, or while being processed. When at rest, attackers may attempt to copy information, install malicious software, or otherwise access private data.

DETAILED DESCRIPTION

When data is at rest, attackers may attempt to copy information, install malicious software, or otherwise access private data. Private data security is increasingly important as people use computers for day-to-day transactions, such as banking, bill payment, and filing taxes. While some mechanisms for securing information are useful, such as encryption and file-level or operating system password protection, these mechanisms are only applicable after an attacker has access to the file system or login screen. What are needed are security mechanisms that deter or defeat an attacker earlier. This disclosure describes two such mechanisms, which may be implemented independently from each other, or in combination.

The first line of defense against an attacker is a physical deterrent. In the current generation of notebooks, which includes netbooks, laptops, and lightweight "Ultrabook®" mobile platforms, there is no physical lock on the lid. Thus, any person, including unauthorized people, may open a notebook lid and begin an attack in an attempt to breach the system. The first mechanism disclosed to prevent such easy access is a mechanical lock securing input and power controls to the notebook, such as by mechanically locking the lid closed. The mechanical lock may be locked and unlocked using various mechanisms including, but not limited to a universal serial bus (USB) key and near field communication (NFC).

The second line of defense against an attack is at the BIOS (basic input/output system). The BIOS is typically a firmware interface for low level computer function. The BIOS is built into a computing platform and is the first component executed when the computing platform is powered on. The purpose of the BIOS is to initialize and test system components and load the operating system. Thus, one mechanism to secure a computer is to implement a password, security credential, or other lock on the BIOS so that the BIOS will not complete its functions without first receiving a proper security credential.

In some systems, a BIOS-level function is used to periodically check on a security status. For example, a computer may "call home" periodically to a server to determine whether the computer is indicated as being stolen or lost. If the security status indicates that the computer may be comprised, the BIOS may initiate additional remedial functions, including but not limited to wiping the hard drive contents, disabling wireless network capabilities, or disabling input mechanisms (e.g., USB ports). If the security status was flagged in error (e.g., the user find the lost computer) or has otherwise been resolved (e.g., the computer is recovered from a thief), the user may have to enter a BIOS security credential in order to unlock the BIOS and clear the security status flag. One mechanism for doing so using NFC is disclosed herein.

Near field communication (NFC) is a set of short-range wireless technologies, typically requiring a distance of 10 cm or less to operate. NFC involves an initiator and a target, where the initiator generates a radio-frequency (RE) field that can power the target, which is passive. As such, NFC targets may take various form factors that do not require batteries such as tags, stickers, key fobs, or cards, NFC peer-to-peer communication is possible if both devices are powered. In peer-to-peer communication, each device reads the other by alternately generating its own field. Because of the relatively short working distance, NFC is more suitable for security because of a lower risk of signal interception.

Figure 1:
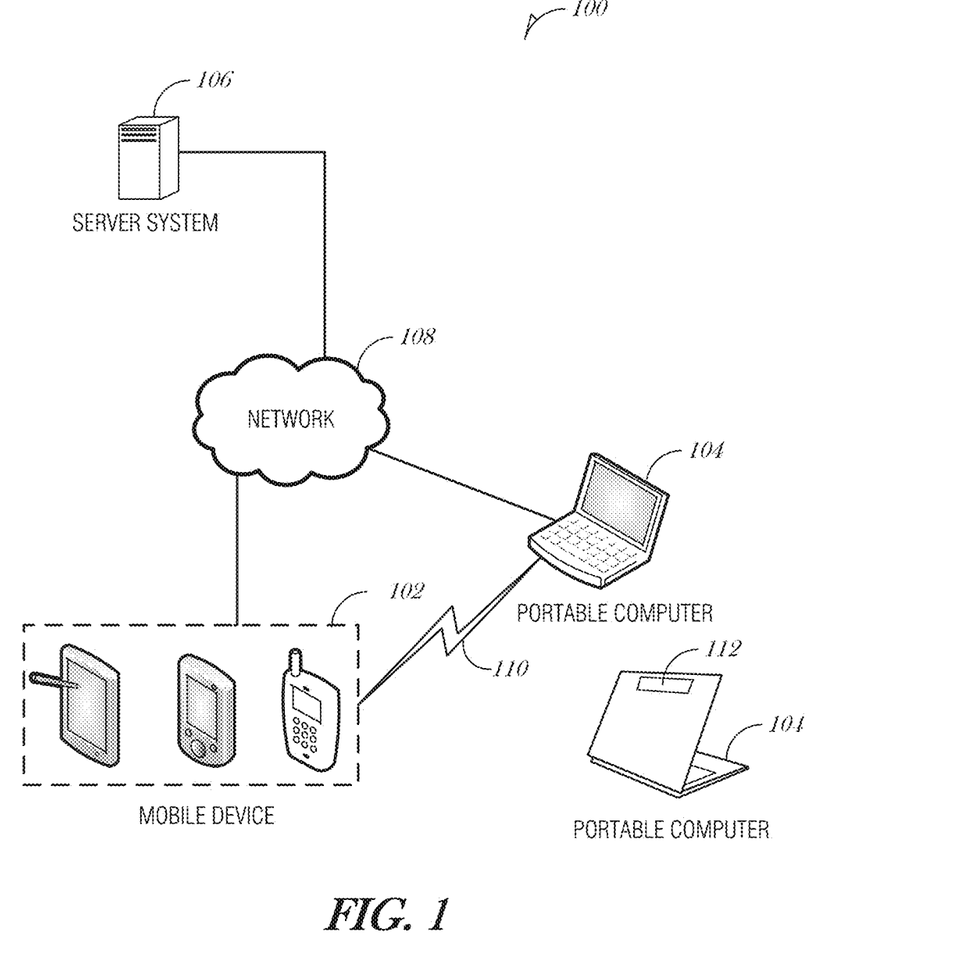
FIG. 1 is a schematic diagram illustrating a system for managing portable computer security, according to an example embodiment.

Turning to the figures, FIG. 1 is a schematic diagram illustrating a system 100 for managing portable computer security, according to an example embodiment. FIG. 1 includes a mobile device 102, a portable computer 104, and a server system 106, interconnected via a network 108. While the server system 106 is illustrated as a single machine in FIG. 1, in various embodiments, the server system 106 may comprise multiple servers working together (e.g., colocated, distributed, or as a cloud-based system).

The mobile device 102 includes devices such as a smartphone, cellular telephone, mobile phone, laptop computer, tablet computer, or other portable networked device. In general, the mobile device 102 is small and light enough to be considered portable (e.g., carried by a person) and includes a mechanism to connect to a network, either over a persistent or intermittent connection.

The portable computer 104 may be equipped similar to the mobile device 102 in that it may include network capabilities and a user interface to receive information from a user and provide information to a user. A feature that the portable computer 104 includes is that of a closable portion. The closable portion may be a door, lid, or other portion of the portable computer's body. In an embodiment, the closable portion is a lid of a laptop with a hinged body (e.g., a clamshell design). A lock may be implemented to secure the closable portion of the portable computer 104. In an embodiment, the lock is an electro-mechanical lock or an electromagnetic lock.

In an embodiment, the portable computer 104 closable portion may be opened by a user with electronic activation. In an embodiment, the portable computer 104 may include a lock that is active to lock or unlock using a cryptographic key or unique unlock sequence transmitted over NFC or by a USB key. In an embodiment, a short-range communication link 110 may be employed to transmit the encrypted key or unlock sequence. The short-range communication link 110 may be NFC.

In an embodiment, the portable computer 104 is enabled with an anti-theft system. One aspect of an anti-theft system includes a lockdown feature. When the lockdown feature is enabled, a portion or all of the contents of the portable computer 104 are secured. For example, the portable computer 104 may be disabled (e.g., the startup procedure is disabled at the BIOS), an electro-mechanical lock may be engaged, or other components may be disabled or hobbled. The lockdown feature may be activated automatically or manually. The lockdown feature may be activated automatically after the expiration of a timer. The portable computer 104 may periodically, regularly, or recurrently communicate with the server system 106 to indicate a security status. If the portable computer 104 fails to connect with the server system 106 for a threshold period (e.g., three days), then the portable computer 104 may automatically activate the lockdown mode on the assumption that the portable computer 104 has been lost, stolen, or otherwise compromised. The lockdown feature may be activated manually, for example by a user via a web site.

To restore normal function and disable the lockdown mode, a user may be required to provide an authentication, such as a password, passphrase, biometric key, or the like. As disclosed herein, a user may use a NFC device to restore function. Also disclosed herein, a user may use a USB key to unlock the portable computer 104. The NFC device or the USB key may be used to unlock a physical lock. In another embodiment, the NFC device or the USB key may be used to provide an authentication passphrase) to a BIOS-level security prompt in order to recover the device from a lockdown mode.

In an embodiment, an electronic display 112 is located on the outside (e.g., exterior surface) of the portable computer 104 to provide a status. For example, the electronic display 112 may be located on the outside of the lid of a laptop (e.g., on the opposing surface from the primary display). As another example, the electronic display 112 may be positioned on the base of the portable computer 104 (e.g., near the keyboard, but visible when the lid is closed). The status may indicate one of various states, including but not limited to the state of the physical lock, whether the portable computer 104 is in a lockdown mode, or whether an attempt to unlock the portable computer 104 was successful.

While a mobile device 102 is discussed in FIG. 1 as being able to store an unlock code and transmit it to the portable computer 104 over the short-range communication link 110, it is understood that other types of media may be used to store the unlock code, including a smart card, MicroSD, UICC SIM cards, an NFC tag, or other products with NFC tag, capabilities.

Figure 2:
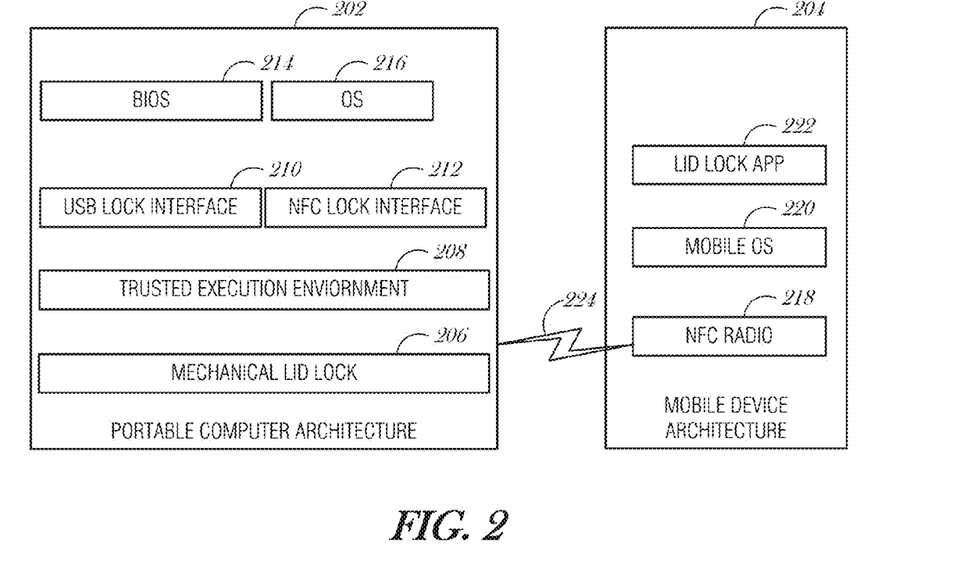
FIG. 2 is a block diagram illustrating computer architectures, according to an example embodiment.

FIG. 2 is a block diagram illustrating computer architectures 200, according to an example embodiment. FIG. 2 illustrates a portable computer architecture 202 and a mobile device architecture 204. The portable computer architecture 202 includes a mechanical lid lock 206, a trusted execution environment (TEE) 208, a USB lock interface 210, an NFC lock interface 212, a BIOS 214, and an operating system (OS) 216. The mobile device architecture 204 includes an NFC radio 218, a mobile OS 220, and a lid lock application 222. The mobile device architecture is able to communicate with the portable computer architecture over a NFC communication link 224.

The mechanical lid lock 206 is only locked/unlocked when the correct key is presented to the portable computer architecture 202. The mechanical lid lock 206 is managed by the TEE 208. In an embodiment, the TEE 208 is a manageability engine (ME). The mechanical lid lock 206 is an electro-mechanical lid lock in an embodiment. In an embodiment, the TEE 208 is powered on when an NFC device is detected. The mechanical lid lock 206 is not dependent on the BIOS 214 or OS 216. Instead, the mechanical lid lock 206 is controlled solely by the NFC lock interface 212 or the USB lock interface 210 via the TEE 208. The NFC lock interface 212 may include an NFC radio to provide unidirectional or bidirectional communication with the mobile device architecture 204.

The NFC lock interface 212 may be controlled by one or more policies. One policy may be that an NFC radio in the NFC lock interface 212 may be always on when the mechanical lid lock 206 is locked. Another policy may be context aware, such that an NFC radio is only active when an NFC device (e.g., a mobile device architecture) is tapped on the portable device architecture 202. Alternately, the NFC radio may be on in a low power scanning mode and the NFC device is detected when in proximity to the portable device architecture 202. Additional policies may be implemented to control the operation of the USB lock interface 210 or NFC lock interface 212.

In operation, a user may desire to unlock the mechanical lid lock 206. Using a mobile device with the mobile device architecture 204, the user may access the lid lock application 222 and transmit an unlock key to the portable device architecture 202 via the USB lock interface 210 or NFC lock interface 212. In the case of using the USB lock interface 210, the user may connect the mobile device architecture 204 to the portable device architecture 202 via a USB port and then activate a transmission via the lid lock application 222. In the case of using NFC, the user may move the mobile device architecture 204 in proximity to the portable device architecture 202, or optionally bump the devices together, in order to initiate a transmission of the unlock key over the NFC communication link 224. When the portable device architecture 202 receives an unlock key via the respective interface, the TEE 208 validates the unlock key and upon validation, sends a signal to the mechanical lid lock 206 to unlock the lid of the portable device. A display on the outside of the portable device may be modified to display the current state of the lid lock or security validation.

The unlock key may be a one-time passcode (OTP). After unlocking the portable device architecture 202, a new OTP may be generated and transmitted to the mobile device architecture 204 for use in a subsequent lock or unlock procedure.

In an embodiment, the lid lock application 222 may be used to obtain an unlock key from a remote server (e.g., server system 106). For example, a user may need to acquire an unlock key. The user may install the lid lock application on a device (e.g., a smartphone) and then connect to the server system 106. After authenticating, the user may then download a copy of the unlock key to the lid lock application 222. Once the unlock key is on the device, the user may then present the device to the locked portable device architecture 202 and unlock the lock.

Figure 3:
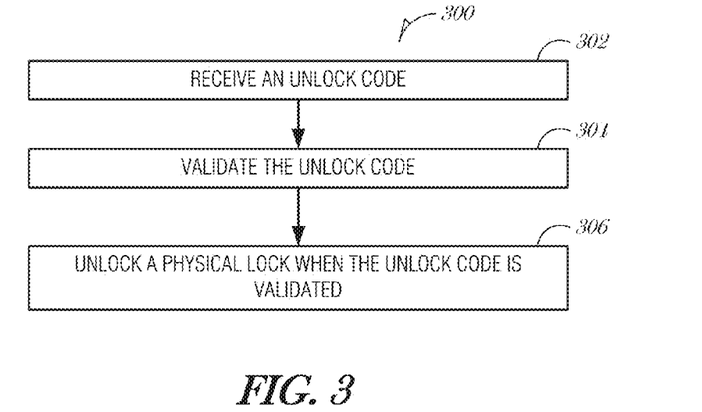
FIG. 3 is a flowchart illustrating a method for unlocking a portable device, according to an embodiment.

FIG. 3 is a flowchart illustrating a method 300 for unlocking a portable device, according to an embodiment. At 302, an unlock code is received at the portable device. In an embodiment, receiving the unlock code comprises receiving the unlock code over a near field communication (NFC) link. As discussed with respect to FIG. 2, the unlock code may be received at a trusted execution environment firmware module in the portable device. The portable device may comprise a portable computing device, such as a laptop, Ultrabook®, netbook, or tablet with a closing latchable lid.

At 304, the unlock code is validated by the portable device. Validating the unlock code may comprise comparing the unlock code to a one-time password stored at the portable device.

At 306, a physical lock installed on the portable device is unlocked when the unlock code is validated. In an embodiment, the physical lock is used to secure the portable device in a closed position. In an embodiment, the physical lock comprises an electro-mechanical lock or an electro-magnetic lock. The physical lock may be used to latch a lid of the portable device to a body of the portable device. For example, in an embodiment, the portable device has a clamshell design with a first and second hinged component and the physical lock latches the first hinged component to the second hinged component. An electro-mechanical lock may be used to magnetically latch the hinged components. Either the electro-mechanical or the electro-mechanical lock may include one or more hooks, fasteners, latches, or magnets to securely fasten the hinged components.

In a further embodiment, the method 300 includes detecting an NFC device, activating a secure execution environment, and querying the NFC device with the NFC radio to obtain the unlock code. The NFC device may be any type of device capable of storing an NFC tag. In embodiments, the NFC device is one of a smartphone or a smart card.

In a further embodiment, the method 300 includes updating a display of the portable device to display a status of the physical lock, in an embodiment, the display is positioned on an exterior surface of the portable device. In an embodiment, the display comprises a set of one or more light-emitting diodes. In an embodiment, the display comprises a liquid crystal display. In an embodiment, the display comprises an electronic ink (e.g., electrophoretic) display.

As discussed above, one anti-theft security mechanism is a lockdown mode. One feature that may exist in a lockdown mode is locking the BIOS with a passphrase, for example. However, existing systems that use a BIOS-level passphrase have several shortcomings. First, touch-based devices are not easy to use when under control of BIOS and some manufacturers do not even support touch input in pre-OS boot mode (e.g., BIOS phase of startup). Second, the BIOS is not easily accessed in many consumer-level devices, including smartphones, tablets, and the like.

In addition to device-based shortcomings, using a BIOS-level passphrase has inherent problems. For example, users need to remember the unlock password and manually enter that password every time they want to unlock the platform.

Thus, because of these shortcomings, a need exists to streamline and simply BIOS-level unlocking mechanisms. Using NFC or USB, a user may provide a BIOS unlock key. Such mechanism are more secure, easier to administrate, and are easier to use.

In an embodiment, an out of band mechanism (e.g., using NFC-based unlock mechanism), a user may receive an unlock code on a smartphone and unlock the device using NFC bump. As another embodiment, the locked device can be unlocked using WWAN (wireless wide-area network) messaging mechanism (e.g., SMS). Such an embodiment includes the use of a 3G modem and WWAN service enabled on the locked device. Other embodiments use a smartcard or other medium that may include an NFC tag.

The disclosure describes two ways to recover a device from lockdown mode: an application-to-application mode and a firmware mode. Each mode may be implemented with either an active or passive NFC device.

Figure 4:
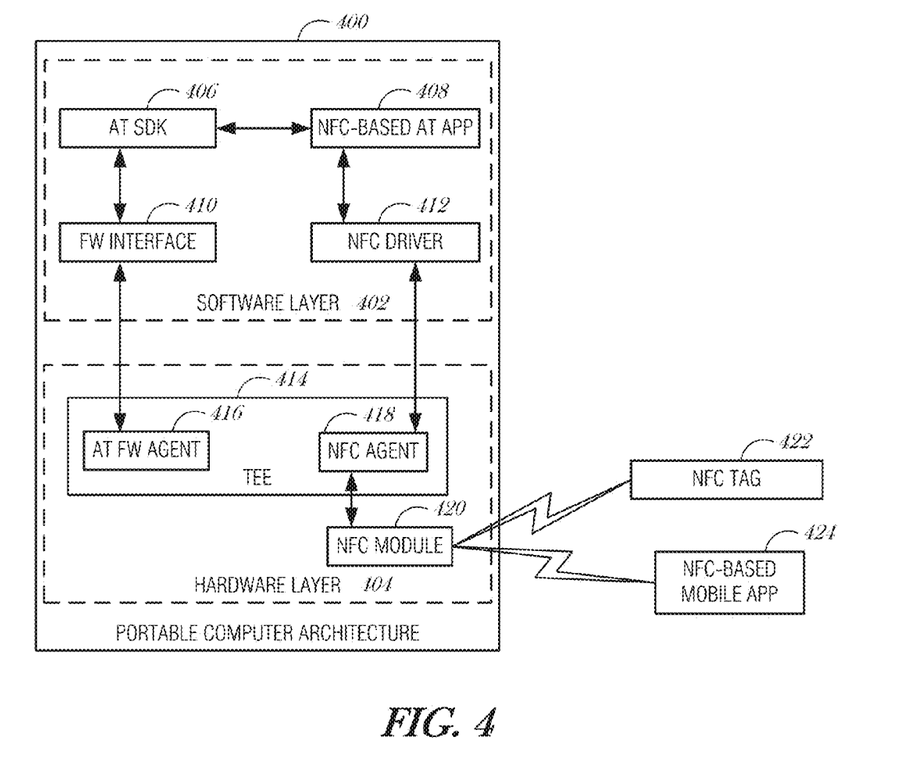
FIG. 4 is a block diagram illustrating a portable device architecture, according to an embodiment.

FIG. 4 is a block diagram illustrating a portable device architecture 400, according to an embodiment. The portable device architecture 400 includes a software layer 402 and a hardware layer 404. The software layer 402 includes an anti-theft software development kit (SDK) 406, an NFC-based anti-theft application 408, a firmware interface 410, and an NFC driver 412.

The anti-theft SDK 406 provide programmatic interfaces for developers to hook into the NFC-based anti-theft application 408 and a firmware interface 410.

The NFC-based anti-theft application 408 provides a user interface to control and manage various aspects of the hardware NFC module 420. Aspects such as policies to control power profiles, may be managed via the NFC-based anti-theft application 408. Also, the NFC-based anti-theft application 408 may be used to provide application-to-application communication, as discussed further below.

The NFC-based anti-theft application 408 interfaces with the NFC driver 412 to control the hardware NFC module 420.

The hardware layer 404 includes a trusted execution environment (TEE) 414, which includes an anti-theft firmware agent 416 and an NFC agent 418. The hardware layer 404 also includes a hardware NFC module 420.

The TEE 414 provides a secured execution environment that is designed to provide a safer and more secure computing platform. Through cryptographic routines and a chain of trust, a computing platform is validated from the initial BIOS load to the point when the operating system loads.

The hardware NFC module 420 includes an antenna to query an NFC tag 422 or other NFC-enabled mobile device. The hardware NFC module 420 may also include an NFC tag for storing information to be queried from another NFC interrogating device.

In addition to the portable device architecture 400, FIG. 4 illustrates the NFC tag 422 and an NFC-based mobile application 424. The NFC-based mobile application 424 may be installed on various types of mobile devices, including but not limited to smartphones, personal digital assistants, laptops, and the like.

In the application-to-application mode, communicating an unlock code to the portable device architecture 400 may be performed at the application layer (e.g., software layer 402). In an embodiment, as shown in FIG. 4, the NFC-based mobile application 424 may be used to unlock a device. When a mobile device is detected in proximity to or tapped on the portable device architecture 400, a peer-to-peer message exchange happens between the NFC-based mobile application 424 running in the mobile device and the NFC-based anti-theft application 408 running in the portable device architecture 400. The NFC-based anti-theft application 408 running on the portable device architecture 400 is responsible to communicate with anti-theft firmware agent 416 through the firmware interface 410 and unlock the firmware. A secured one time token stored in the mobile device may be passed to anti-theft firmware agent 416 through the peer-to-peer NFC communication.

In an example, when the portable device is tapped with the mobile device, then a one time token stored in the mobile device gets used. To prepare the mobile device for the next unlock usage, a new token is generated by the firmware and transmitted to the mobile device over a communication channel (e.g., SMS or NFC). In an example, when tapping happens, the client machine gets unlocked and the mobile device gets a new token for next time usage over NFC from the software running in client machine.

In the firmware mode, the circuitous route through the software layer 402 is avoided and the NFC agent 418 communicates directly with the anti-theft firmware agent 416. This provides a more secured way to unlock a platform because there is no software-based agent (in the operating system) required to unlock the device. The firmware mode may be implemented with an NFC tag 422 or other NFC-enabled device, such as a smartcard or a smartphone with appropriate circuitry.

An NFC tag 422 is advantageous because a user does not have to invest in an expensive mobile device to unlock a platform. A key can be used to lock and unlock a device. Every time the one time token is used, anew token can be written back to the NFC tag 422 for future use.

Figure 5:
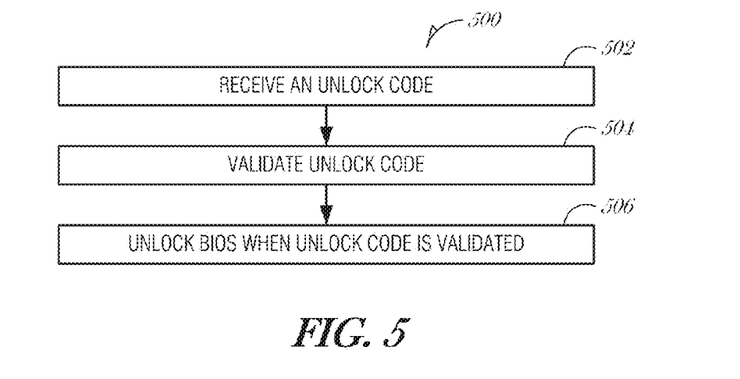
FIG. 5 is a flowchart illustrating a method for providing BIOS authentication for a portable device, according to an embodiment.

FIG. 5 is a flowchart illustrating a method 500 for providing BIOS authentication for a portable device, according to an embodiment. At 502, an unlock code is received at the portable device over a short-range communication protocol. In an embodiment, the short-range communication protocol comprises near field communication (NFC). In an embodiment, receiving the unlock code comprises receiving the unlock code from an NFC tag. In an embodiment, receiving the unlock code comprises receiving the unlock code from an NFC-enabled device. In various embodiments, the NFC-enabled device comprises one of a smartphone, a smartcard, or a mobile computer. In an embodiment, a tap of an NFC device is detected, and upon detection of the tap, an NFC tag incorporated into the NFC device is read.

At 504, the unlock code is validated by the portable device. In an embodiment, the unlock code is a cryptographic key. In an embodiment, the unlock code is an unlock sequence.

At 506, a basic input/output system (BIOS) of the portable device is unlocked when the unlock code is validated. Unlocking the BIOS allows the portable device to continue its boot sequence.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Figure 6:
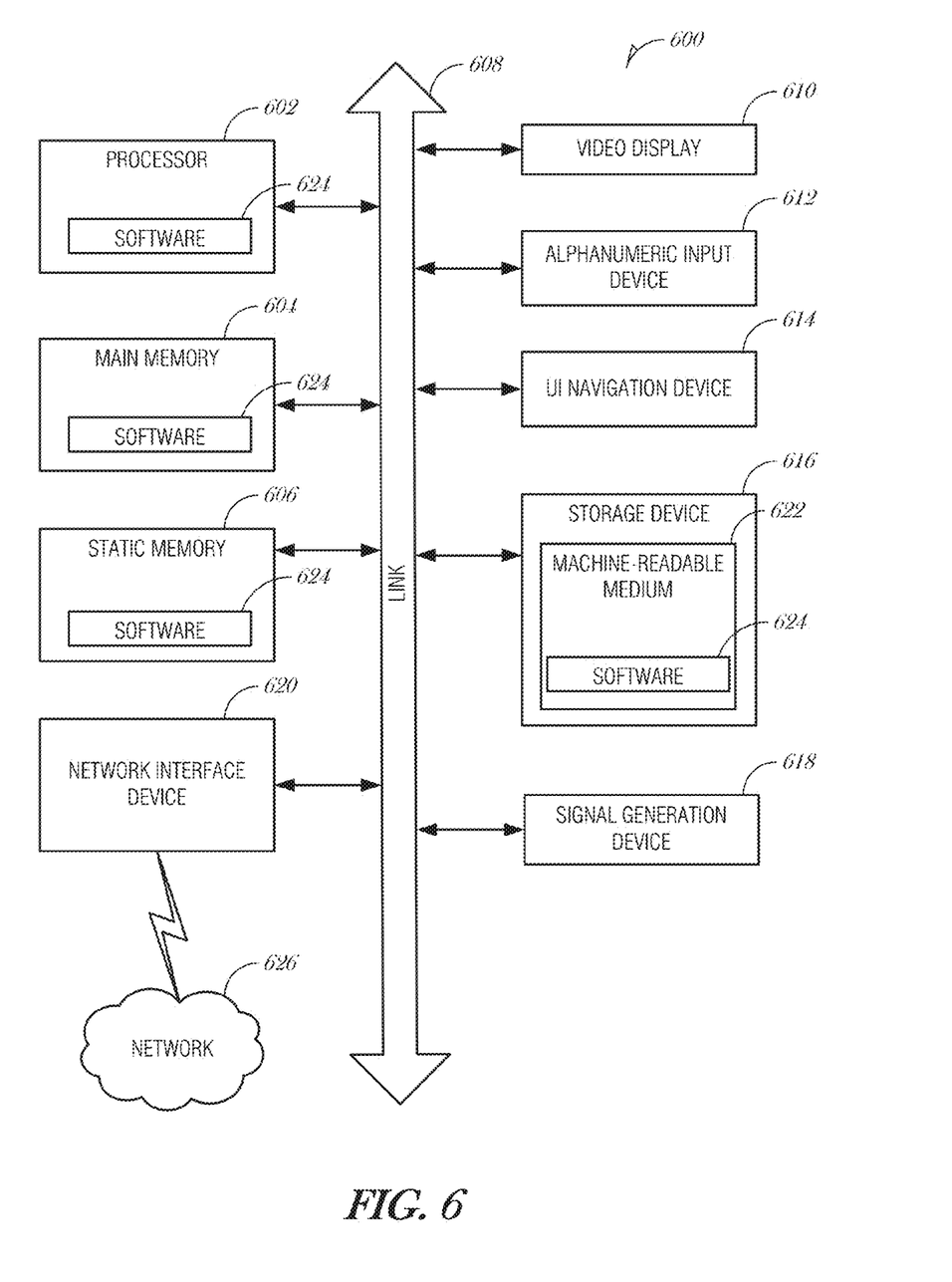
FIG. 6 is a block diagram illustrating a machine in the example form of a computer system, within which a set or sequence of instructions for causing the machine to perform any one of the methodologies discussed herein may be executed, according to an example embodiment.

FIG. 6 is a block diagram illustrating a machine in the example form of a computer system 600, within which a set or sequence of instructions for causing the machine to perform any one of the methodologies discussed herein may be executed, according to an example embodiment. In alternative embodiments, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing, instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g, bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a mission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, one instantiation of a module may not exist simultaneously with another instantiation of the same or different module. For example, where the modules comprise a general-purpose hardware processor configured using software, the general-purpose hardware processor can be configured as respective different modules at different times. Accordingly, software can configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

Additional Notes & Examples

Example 1 includes subject matter (such as a device, apparatus, or user equipment (UE)) comprising a portable device comprising: an electro-mechanical lock; and a firmware module coupled to the electro-mechanical lock, the firmware module configured to: receive an unlock code; validate the unlock code; and unlock the electro-mechanical lock when the unlock code is validated.

In Example 2, the subject matter of Example 1 may optionally include, wherein the electro-mechanical lock latches a lid of the portable device to a body of the portable device.

In Example 3 the subject matter of any one or both of Examples 1 or 2 may optionally include, wherein the portable device has a clamshell design with a first and second hinged component and wherein the electro-mechanical lock latches the first hinged component to the second hinged component.

In Example 4 the subject matter of any one or more of Examples 1 to 3 may optionally include, a display configured to display a status of the electro-mechanical lock, wherein the display is positioned on an exterior surface of the portable device.

In Example 5 the subject matter of any one or more of Examples 1 to 4 may optionally include, wherein the display comprises a set of one or more light-emitting diodes.

In Example 6 the subject matter of any one or more of Examples 1 to 5 may optionally include, wherein the display comprises a liquid crystal display.

In Example 7 the subject matter of any one or more of Examples 1 to 6 may optionally include, wherein the display comprises an electronic ink display.

In Example 8 the subject matter of any one or more of Examples 1 to 7 may optionally include, a universal serial port (USB) configured to: connect to a USB device; and receive the unlock code.

In Example 9 the subject matter of any one or more of Examples 1 to 8 may optionally include, an NFC radio, and wherein the firmware module is configured to: detect an NFC device; activate a secure execution environment; and query the NFC device with the NFC radio to obtain the unlock code.

In Example 10 the subject matter of any one or more of Examples 1 to 9 may optionally include, wherein the firmware module is a trusted execution environment.

Example 11 includes or may optionally be combined with the subject matter of any one of Examples 1-10 to include subject matter (such as a method, means for performing acts, machine readable medium including instructions for unlocking a portable device that, when performed by a machine cause the machine to performs acts, or an apparatus configured to perform) comprising receiving an unlock code at the portable device; validating by the portable device, the unlock code; and unlocking a physical lock installed on the portable device when the unlock code is validated, the physical lock to secure the portable device in a closed position.

In Example 12, the subject matter of Example 11 may optionally include, wherein receiving the unlock code comprises receiving the unlock code over a near field communication (NFC) link.

In Example 13 the subject matter of any one or both of Examples 11 or 12 may optionally include, detecting an NFC device; activating a secure execution environment; and querying the NFC device with the NFC radio to obtain the unlock code.

In Example 14 the subject matter of any one or more of Examples 11 to 13 may optionally include, wherein validating the unlock code comprises: comparing the unlock code to a one-time password stored at the portable device.

In Example 15 the subject matter of any one or more of Examples 11 to 14 may optionally include, wherein the NFC device is one of a smartphone or a smart card.

In Example 16 the subject matter of any one or more of Examples 11 to 15 may optionally include, wherein the physical lock comprises an electro-mechanical lock or an electro-magnetic lock.

In Example 17 the subject matter of any one or more of Examples 11 to 16 may optionally include, wherein the physical lock latches a lid of the portable device to a body of the portable device.

In Example 18 the subject matter of any one or more of Examples 11 to 17 may optionally include, wherein the portable device has a clamshell design with a first and second hinged component and wherein the physical lock latches the first hinged component to the second hinged component.

In Example 19 the subject matter of any one or more of Examples 11 to 18 may optionally include, updating a display of the portable device to display a status of the physical lock, wherein the display is positioned on an exterior surface of the portable device.

In Example 20 the subject matter of any one or more of Examples 11 to 19 may optionally include, wherein the display comprises a set of one or more light-emitting diodes.

In Example 21 the subject matter of any one or more of Examples 11 to 20 may optionally include, wherein the display comprises a liquid crystal display.

In Example 22 the subject matter of any one or more of Examples 11 to 21 may optionally include, wherein the display comprises an electronic ink display.

In Example 23 the subject matter of any one or more of Examples 11 to 22 may optionally include, wherein the unlock code is received at a trusted execution environment firmware module in the portable device.

In Example 24 the subject matter of any one or more of Examples 11 to 23 may optionally include, wherein the portable device comprises a portable computing device.

In Example 25 the subject matter of any one or more of Examples 11 to 24 may optionally include, wherein the portable computing device includes one of a laptop, an ultrabook, a netbook, or a tablet.

Example 26 includes or may optionally be combined with the subject matter of any one of Examples 1-25 to include subject matter (such as a device, apparatus, or user equipment (UE)) comprising a portable device comprising: an electro-mechanical lock; a firmware module coupled to the electro-mechanical lock; and an NFC radio configured to scan for an NFC device and activate the firmware module upon detection of the NFC device, wherein, after the firmware module is activated, the firmware module is configured to: query the NFC device with the NFC radio to obtain the unlock code; validate the unlock code; and unlock the electro-mechanical lock when the unlock code is validated.

In Example 27, the subject matter of Example 26 may optionally include, wherein the firmware module interfaces with the NFC radio via an interface module.

Example 28 includes or may optionally be combined with the subject matter of any one of Examples 1-27 to include subject matter (such as a device, apparatus, or user equipment (LIE)) comprising a device for managing BIOS authentication, the device comprising: an NFC module, the NFC module comprising an NFC antenna; and a firmware module, wherein the firmware module is configured to: receive an unlock code from an NFC device via the NFC antenna; validate the unlock code; and unlock a BIOS of the device when the unlock code is validated.

In Example 29, the subject matter of Example 28 may optionally include, wherein the unlock code is a cryptographic key.

In Example 30 the subject matter of any one or both of Examples 28 or 29 may optionally include, wherein the unlock code is an unlock sequence.

In Example 31 the subject matter of any one or more of Examples 28 to 30 may optionally include, wherein the NFC module is configured to detect a tap of the NFC device, and upon detection of the tap, read an NFC tag incorporated into the NFC device.

In Example 32 the subject matter of any one or more of Examples 28 to 31 may optionally include, a user application module configured to receive the unlock code and transmit the unlock code to the firmware module for validation.

Example 33 includes or may optionally be combined with the subject matter of any one of Examples 1-32 to include subject matter (such as a method, means for performing acts, machine readable medium including instructions for providing BIOS authentication for a portable device that, when performed by a machine cause the machine to performs acts, or an apparatus configured to perform) comprising receiving an unlock code at the portable device over a short-range communication protocol; validating, by the portable device, the unlock code; and unlocking a basic input/output system (BIOS) of the portable device when the unlock code is validated.

In Example 34, the subject matter of Example 33 may optionally include, wherein the short-range communication protocol comprises near field communication (NFC).

In Example 35 the subject matter of any one or both of Examples 33 or 34 may optionally include, wherein receiving the unlock code comprises receiving the unlock code from an NFC tag.

In Example 36 the subject matter of any one or more of Examples 32 to 35 may optionally include, wherein receiving the unlock code comprises receiving the unlock code from an NFC-enabled device.

In Example 37 the subject matter of any one or more of Examples 32 to 36 may optionally include, wherein the NFC-enabled device comprises one of a smartphone, a smartcard, or a mobile computer.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B"

includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device for managing basic input/output system (BIOS) authentication, the device comprising:
   an NFC radio, the NFC radio comprising an NFC antenna; and
   a firmware module, wherein the firmware module is configured to:
      receive an unlock code from an NFC device via the NFC antenna, the unlock code representing a secured one-time token;
      validate the unlock code;
      unlock a BIOS of the device when the unlock code is validated, wherein the BIOS was locked as a result of a lockdown mode being activated;
      generate a new unlock code; and
      transmit the new unlock code to the NFC device to unlock the BIOS during a later unlock process.

2. The device of claim 1, wherein the unlock code is a cryptographic key.

3. The device of claim 1, wherein the unlock code is an unlock sequence.

4. The device of claim 1, wherein the NFC radio is configured to detect a tap of the NFC device, and upon detection of the tap, read an NFC tag incorporated into the NFC device.

5. The device of claim 1, comprising a user application module configured to receive the unlock code and transmit the unlock code to the firmware module for validation.

6. The device of claim 1, wherein the lockdown mode was activated upon an expiration of a timer.

7. The device of claim 1, wherein the lockdown mode was activated upon failure to connect with a server for a threshold period.

8. The device of claim 1, wherein the lockdown mode was activated manually be a user via a web site.

9. A method for providing basic input/output system (BIOS) authentication for a portable device, comprising:
   receiving an unlock code at the portable device over a short-range communication protocol from an NFC device;
   validating by the portable device, the unlock code, the unlock code representing a secured one-time token; and
   unlocking a BIOS of the portable device when the unlock code is validated, wherein the BIOS was locked as a result of a lockdown mode being activated;
   generating a new unlock code; and
   transmitting the new unlock code to the NFC device to unlock the BIOS during a later unlock process.

10. The method of claim 9, wherein the short-range communication protocol comprises near field communication (NFC).

11. The method of claim 9, wherein the unlock code is a cryptographic key.

12. The method of claim 9, wherein the unlock code is an unlock sequence.

13. The method of claim 9, wherein receiving the unlock code comprises receiving the unlock code from an NFC tag.

14. The method of claim 9, wherein receiving the unlock code comprises receiving the unlock code from an NFC-enabled device.

15. At least one non-transitory machine-readable storage medium comprising instructions for providing basic input/output system (BIOS) authentication for a portable device, which when executed by the portable computing device cause the portable computing device to perform the operations of:
   receiving an unlock code at the portable device over a short-range communication protocol from an NFC device;
   validating by the portable device, the unlock code, the unlock code representing a secured one-time token; and
   unlocking a BIOS of the portable device when the unlock code is validated, wherein the BIOS was locked as a result of a lockdown mode being activated;
   generating a new unlock code; and
   transmitting the new unlock code to the NFC device to unlock the BIOS during a later unlock process.

16. The at least one non-transitory machine-readable storage medium of claim 15, wherein the short-range communication protocol comprises near field communication (NFC).

17. The at least one non-transitory machine-readable storage medium of claim 15, wherein the unlock code is a cryptographic key.

18. The at least one non-transitory machine-readable storage medium of claim 15, wherein the unlock code is an unlock sequence.

19. The at least one non-transitory machine-readable storage medium of claim 15, wherein the instructions to receive the unlock code comprise instructions to receive the unlock code from an NFC tag.

20. The at least one non-transitory machine-readable storage medium of claim 15, wherein the instructions to receive the unlock code comprise instructions to receive the unlock code from an NFC-enabled device.

* * * * *

UNITED STATES PATENT AND TRADEMARK OFFICE
CERTIFICATE OF CORRECTION

PATENT NO. : 9,842,213 B2
APPLICATION NO. : 15/218277
DATED : December 12, 2017
INVENTOR(S) : Dadu et al.

Page 1 of 1

It is certified that error appears in the above-identified patent and that said Letters Patent is hereby corrected as shown below:

On the Title Page

On page 2, in Column 2, item (56) under "Other Publications", Line 14, delete "Jul. 17," and insert --Jul. 01,-- therefor Signed and Sealed this
Twenty-eighth Day of May, 2019

Andrei Iancu
*Director of the United States Patent and Trademark Office*